US011763250B2

(12) United States Patent
Ferreira et al.

(10) Patent No.: US 11,763,250 B2
(45) Date of Patent: Sep. 19, 2023

(54) EFFICIENT SYNCING OF RFID ITEM DATA BETWEEN MOBILE DEVICES AND CENTRAL SERVERS

(71) Applicant: Sensormatic Electronics, LLC, Boca Raton, FL (US)

(72) Inventors: Miguel Ferreira, Sao Joao da Madeira (PT); Wilson Oliveira, Sao Joao da Madeira (PT); Miguel Bento, Sao Joao da Madeira (PT)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 198 days.

(21) Appl. No.: 15/931,354

(22) Filed: May 13, 2020

(65) Prior Publication Data

US 2020/0372444 A1 Nov. 26, 2020

Related U.S. Application Data

(60) Provisional application No. 62/850,263, filed on May 20, 2019.

(51) Int. Cl.
*G06Q 10/08* (2023.01)
*G06K 7/10* (2006.01)
(Continued)

(52) U.S. Cl.
CPC ....... *G06Q 10/087* (2013.01); *G06K 7/10366* (2013.01); *H04W 4/20* (2013.01); *H04W 4/35* (2018.02)

(58) Field of Classification Search
CPC ............. G06Q 10/087; G06K 7/10366; G06K 7/0008; H04W 4/20; H04W 4/35; H04W 4/80
See application file for complete search history.

(56) References Cited

U.S. PATENT DOCUMENTS

2007/0035396 A1\* 2/2007 Chand .................... G06Q 30/06
340/572.1
2007/0159330 A1\* 7/2007 Chakraborty ......... H04L 9/3226
340/572.1

(Continued)

FOREIGN PATENT DOCUMENTS

CN 101183423 A \* 5/2008
EP 2407909 A1 1/2012

OTHER PUBLICATIONS

Simatic, Michel, "Choosing the Right RFID-Based Architectural Pattern", Jun. 5, 2013, Radio Frequency Identification from System to Applications, pp. 1-34. (Year: 2013).\*

(Continued)

*Primary Examiner* — Ariel J Yu
*Assistant Examiner* — Denisse Y Ortiz Roman
(74) *Attorney, Agent, or Firm* — ArentFox Schiff LLP

(57) ABSTRACT

Aspects of the present disclosure provide techniques to synchronize a wireless device and a server in an RFID inventory management system. The device may detect a one or more signals from an electronic product code (EPC) tag. The device may generate an EPC tag data set based on the one or more signals. The device may update a local tag state database based on the EPC tag data set. The device may determine, based on a configuration profile of a server, a subset of the tag data set for transmission to the server. The device may wirelessly transmit the subset of the tag data set. The server may update a master product state database based on the received subset of the tag data set. The server may determine an update for the second wireless device based on the master product state database and a configuration profile of the second device.

24 Claims, 6 Drawing Sheets

(51) Int. Cl.
  *H04W 4/20* (2018.01)
  *H04W 4/35* (2018.01)
  *G06Q 10/087* (2023.01)

(56) References Cited

U.S. PATENT DOCUMENTS

2009/0291668 A1* 11/2009 Huang ................. G06K 7/0008
                                                    455/410
2018/0137460 A1*  5/2018 Stiefel ................. G06Q 10/087
2019/0354992 A1* 11/2019 Duckett ............... G06Q 30/018

OTHER PUBLICATIONS

Anonymous:"Choosing the Right RFID-Based Architectural Pattern | IntechOpen", Jun. 5, 2013 pp. 1-22.
International Search Report and Written Opinion for PCT/US2020/033323 dated Sep. 14, 2020.

* cited by examiner

EFFICIENT SYNCING OF RFID ITEM DATA BETWEEN MOBILE DEVICES AND CENTRAL SERVERS

CLAIM OF PRIORITY UNDER 35 U.S.C. § 119

This application claims priority to U.S. Provisional Application No. 62/850,263 titled "EFFICIENT SYNCING OF RFID ITEM DATA BETWEEN MOBILE DEVICES AND CENTRAL SERVERS," filed May 20, 2019, which is assigned to the assignee hereof, and incorporated herein by reference in its entirety.

BACKGROUND

The present disclosure relates generally to inventory management utilizing radio-frequency identification (RFID) technology to capture electronic product code (EPC) tags, and more specifically to transfer of item data between devices.

In recent years, retailers (e.g., apparel retailers) have deployed a radio frequency identification system in stores to track its products' movements as they arrive at stores, are placed on display on the sales floor, and are sold. By adopting RFID, retailers are able to reduce the amount of time that its store employees spend counting the inventory (e.g., manually counting inventor that is on the floor and in stock room), as well as increase merchandise visibility within each store, thereby enabling shoppers in the store and online to find what they seek, at the location where they need it.

SUMMARY

Aspects of the present disclosure provide methods, apparatuses, and non-transitory computer-readable medium for data synchronization of inventory management systems utilizing radio-frequency identification (RFID) technology. The method may include detecting, via an antenna of a RFID reader, one or more signals from an electronic product code (EPC) tag. The method may include generating an EPC tag data set based on the one or more signals. The method may include updating a local tag state database based on the EPC tag data set. The method may include determining, based on a configuration profile of a server, a subset of the tag data set for transmission to the server. The method may include wirelessly transmitting the subset of the tag data set to the server.

The disclosure also provides an apparatus (e.g., a RFID reader) including a memory storing computer-executable instructions and at least one processor configured to execute the computer-executable instructions to perform the above method, an apparatus including means for performing the above method, and a non-transitory computer-readable medium storing computer-executable instructions for performing the above method.

In another aspect, the disclosure provides a second method, apparatus, and non-transitory computer readable medium for data synchronization for a server. The method may include receiving, at a server from a first wireless device, an uplink product update data set, the uplink product update data set including a set of product data based on a configuration profile of the server. The method may include updating, by the server, a master product state database based on the uplink product update data set. The method may include determining, by the server, that a product state database of a second wireless device should be updated based on the master product state database and a configuration profile of the second wireless device. The method may include determining a downlink product update data set including a subset of the uplink product update data set. The method may include transmitting the downlink product update data set to the second wireless device.

The disclosure also provides an apparatus (e.g., a server) including a memory storing computer-executable instructions and at least one processor configured to execute the computer-executable instructions to perform the above second method, an apparatus including means for performing the above second method, and a non-transitory computer-readable medium storing computer-executable instructions for performing the above second method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
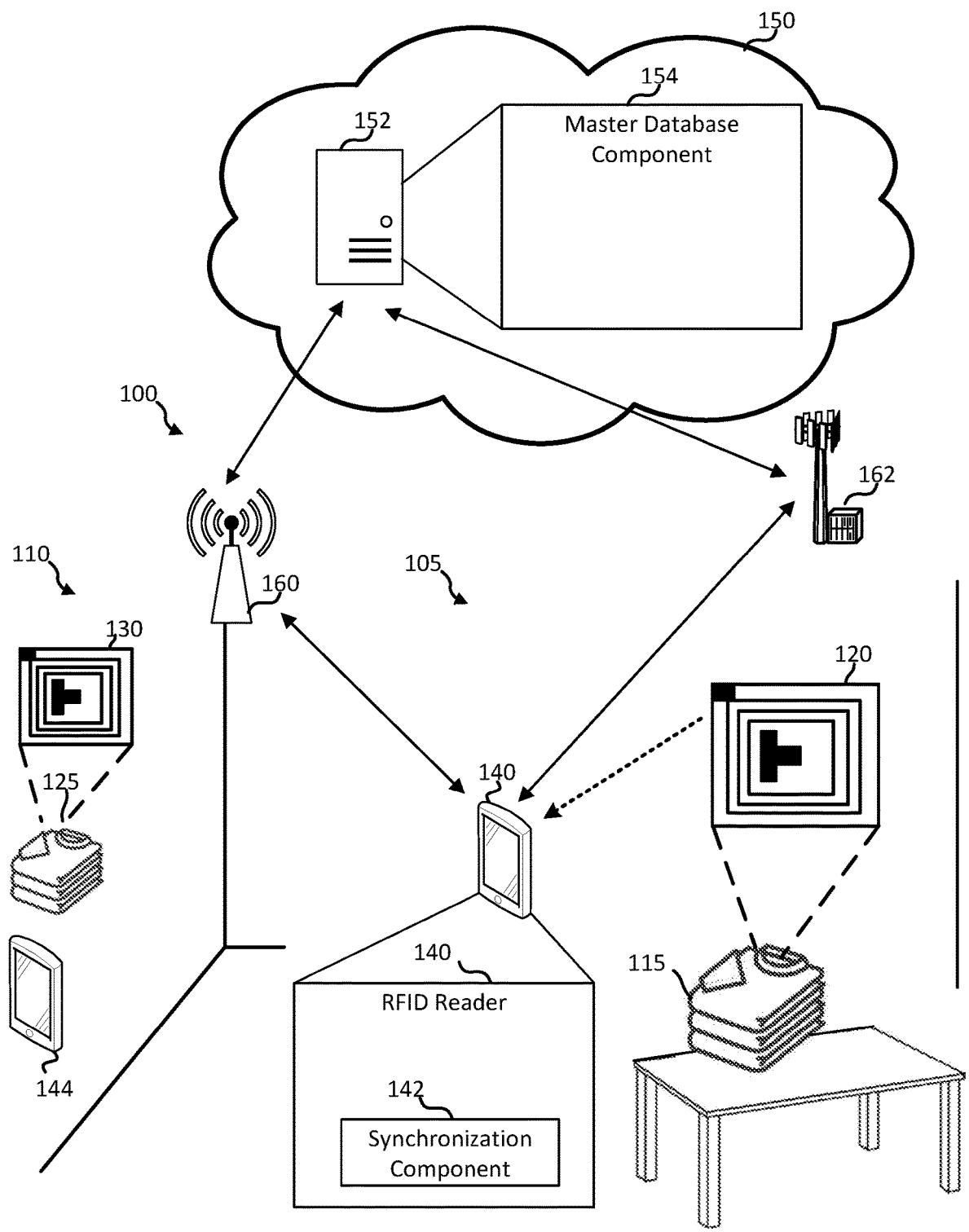
FIG. 1 is a diagram illustrating an example of a retail store employing an inventory management system in accordance with aspects of the present disclosure.

FIG. 1 is a diagram illustrating an example of a retail store 100 employing an inventory management system 150 in accordance with aspects of the present disclosure. In some examples, the retail space (e.g., apparel store) may be divided into a front-end "sales floor" 105 for interfacing with the customers and the back-end stockroom 110 for storing excess inventory 125. Although aspects of the present disclosure are described with respect to an example of a retail store 100, the techniques described herein may be implemented in other scenarios.

As discussed above, retailers (e.g., apparel retailers) have deployed a radio frequency identification system in stores to track product movements as they arrive at stores, are placed on display on the sales floor, and are sold. By adopting RFID, retailers are able to reduce the amount of time that the store employees spend counting the inventory (e.g., manually counting inventor that is on the floor and in stock room), as well as increase merchandise visibility within each store, thereby enabling shoppers in the store and online to find what they seek, at the location where they need the product. RFID use radio waves to read and capture information stored on a tag attached to an object. A tag (e.g., EPC tag 120) can be read from up to several feet away and does not need to be within direct line-of-sight of the reader to be tracked.

Thus, an RFID system may be made up of two parts: a tag or label (e.g., EPC tag 120) and a reader (e.g., handheld RFID reader 140). RFID tags 120 (which may also be referred to as labels) are embedded with an RFID transmitter and a receiver. The RFID component on the tags may include a microchip that stores and processes information, and an antenna to receive and transmit a signal. The EPC tag 120 (or 130) may further contain the specific serial number for each specific object 115. For example, in one implementation, an EPC tag 120 may include multiple memory banks such as a reserved memory, EPC memory, tag identification (TID) memory, and user memory. The reserved memory bank may include an access password and a kill password. The EPC memory may include the EPC, a protocol control, and a cyclic redundancy check value. The TID memory may include a tag identification. The user memory may store custom data.

To read the information encoded on an EPC tag 120, a two-way radio transmitter-receiver called an interrogator or reader (e.g., RFID reader 140) emits a signal to the EPC tag 120 using the antenna (e.g., internal antennas for mobile RFID reader 140). The reader 140 may apply filtering to indicate what memory bank the EPC tag 120 should respond with. The EPC tag 120 may respond with the information (e.g., EPC value or serial number) written in the memory bank. For purposes of this disclosure, the terms, the EPC tag and RFID tag may be used interchangeably. The EPC tag 120 may be a passive tag or a batter powered EPC tag. A passive RFID tag may use the RFIC interrogator or receiver's 140 radio wave energy to relay the stored information back to the interrogator. In contrast, a battery powered EPC tag 120 may be embedded with a small battery that powers the relay of information.

In a retail setting, EPC tags 120 and 130 may be attached to objects 115 such as articles of clothing or any merchandise. When an inventory associate uses a handheld RFID reader to scan a shelf of jeans or shirt, the associate is able to differentiate between two pairs of identical jeans based upon the information stored on the RFID tag without the need to individually scan each article of clothing because each article will have its own serial number and the RFID reader 140 may be able to read a plurality of EPC tags 120 on the floor of a plurality of different merchandise in one instance.

As such, with one pass of the handheld RFID reader 140, the associate can not only find a specific article, but the RFID reader 140 may also output inventory count of how many of each article are on the shelf and which articles need to be replenished. The associate can learn all of this information without having to scan each individually.

In an aspect, an inventory management system 150 may collect information from RFID readers 140 to manage an inventory of one or more retail locations. For example, the inventory management system 150 may be provided as a web application hosted on a server 152 that allows multiple RFID readers 140, 144 to update an inventory database. The RFID readers 140 may be connected to the inventory management system 150 via a wireless network connect. For example, an RFID reader 140 may be connected via a wireless access point 160 of a wireless local area network (WLAN)) or via a base station 162 of a wireless wide area network (WWAN). In either case, connectivity and/or bandwidth between the RFID reader 140 and the server 152 may be limited. For example, there may be regions of the retail store 100 in which a wireless connection is unavailable. Accordingly, an RFID reader 140 may be unable to transmit or receive updates regarding the inventory for periods of time. Additionally, there may be costs associated with transmitting data, so it may be beneficial to minimize data transfers when they occur.

Mobile solutions for retail stores that are built around RFID tags require large amount of data for their operation. The data includes RFID tag data, tag location, store layout, product details etc. For a store with millions of items, the transfer of such data will make the mobile device extremely slow and many cases unusable. Wireless bandwidth limitations exacerbate the problem.

The present disclosure provides techniques for synchronizing inventory data between wireless RFID readers 140 and a server 152 of an inventory management system 150. These techniques alleviate this problem with an efficient data transfer methodology between the mobile device and the central server which is the main repository for all store item data. An application running on the RFID reader 140 and server 152 may enforce an offline first strategy to enable continuous operation of the mobile device retail store applications even in situations where there is limited connectivity to a central server. To achieve this, the application may maintain state persistence by keeping track of state changes for all relevant data elements on any given device and other devices that operate in conjunction with this device that influences its scope of activity (e.g., within a store).

The server 152, may maintain a full picture of scope state, and may be the owner of truth, responsible for conflict resolution (e.g., two devices with a different change to the same data item). Multiple clients consuming and producing multiple state change-sets are coordinated by the central server. Only state changes of data elements are uploaded from any device to the central server. The mobile devices only download state changes and the context in which the state changed from the central server to the mobile device. This avoids the transfer of large amounts of data to and from the central server freeing up scant resources on mobile devices and allows much more efficient use of wireless bandwidth in poor connectivity stores. Working with state changes along with the context of the state change avoids expensive computations on the mobile device to consolidate state changes for each data element. Scope state change is built from a log of operational events, that can be grouped as required to compose a state change-set as differentials, and are transferred and treated in that manner.

The RFID reader 140 may include a synchronization component 142 configured to detect, via an antenna of a RFID reader, one or more signals from an electronic product code (EPC) tag; generate an EPC tag data set based on the one or more signals; update a local tag state database based on the EPC tag data set; determine, based on a configuration profile of a server, a subset of the tag data set for transmission to the server; and wirelessly transmit the subset of the tag data set to the server. As used herein, the term "subset" may refer to a non-empty set of tag data that includes less than all of the tag data set.

The server 152 may include a master database component 154 configured to receive, at a server from a first wireless device, an uplink product update data set, the uplink product update data set including a set of product data based on a configuration profile of the server; updating, by the server, a master product state database based on the uplink product update data set; determine, by the server, that a product state database of a second wireless device should be updated based on the master product state database and a configuration profile of the second wireless device; determine a downlink product update data set including a subset of the uplink product update data set; and transmit the downlink product update data set to the second wireless device.

Figure 2:
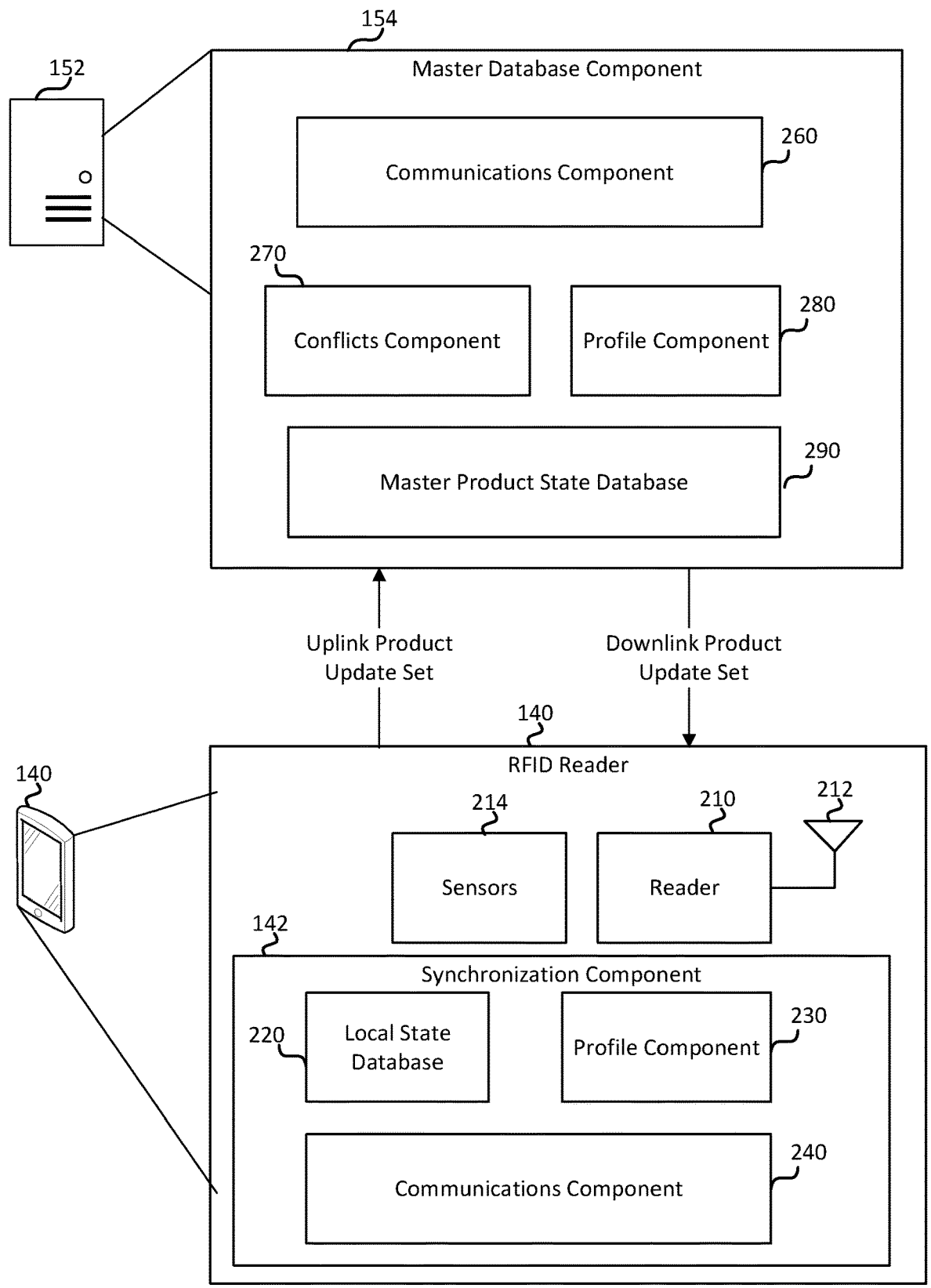
FIG. 2 is a diagram of example communications between a wireless RFID reader and a server.

Turning to FIG. 2, a more detailed view of the RFID reader 140 includes a reader 210, an antenna 212, sensors 214 and the synchronization component 142 including a local state database 220, a profile component 230, and a communications component 240. The reader 210 may detect, via the antenna 212 one or more signals from an EPC tag 120 and generate an EPC tag data set based on the one or more signals. The reader 210 may retrieve tag data every time a response is received from the EPC tag 120. For example during a cycle count the same EPC tag 120 can be read multiple times. The reader 210 may decide which read to store as the EPC tag data set. The EPC tag data set may include any information stored on the EPC tag 120 as well as information about reading the EPC tag 120. For example, the EPC tag data set may include: a timestamp, a location, a signal transmission power, a received signal strength indication (RSSI), and an identifier of the RFID reader 140. The sensors 214 may include other sensors of the RFID reader 140 that may be used to collect data such as a camera, a barcode scanner, or a GPS sensor. Information from the sensors 214 may be used to generate data elements in the EPC tag data set. In some cases where no EPC tag is present, the information from the sensors 214 may generate a product data set. In an aspect, the EPC tag data set may be stored as a database, which may reduce access to RAM of the RFID reader 140.

The synchronization component 142 may update the local state database 220 with the EPC tag data set. For example, the synchronization component 142 may merge the EPC data set with the local state database 220. The local state database 220 may maintain state information based on data obtained directly by the RFID reader 140 (e.g., by scanning) and information acquired through updates from the server 152, as discussed in further detail below.

The synchronization component 142 may determine how to update the server 152 based on a profile of the server 152. For example, the profile component 230 may include a configuration profile for the server 152 that indicates, for each data element, whether to include the data element in an update data set. The configuration profile may also indicate how often to send the update data set. For example, the configuration profile may indicate that only data elements that for tracking the location of an article should be included. Accordingly, for example, the profile component 230 may determine to include a timestamp, location, and identifier of the article, but may exclude a signal power. The profile component 230 may store a subset of the EPC tag data set as an update data set. The communications component 240 may wirelessly transmit the update data set when a connection is available and based on the configuration profile.

The master database component 154 may manage a master product state database 290 that includes state information of an inventory based on updates from multiple RFID readers 140. The master database component 154 may synchronize each of the multiple RFID readers 140 to the master product state database 290 by transmitting updates. The master database component 154 may also resolve conflicts between updates received from two different RFID readers 140. The master database component 154 may include a communications component 260, a conflicts component 270, a profile component 280, and the master product state database 290.

The communications component 260 may receive, from a first wireless device, an uplink product update data set. The uplink product update data set may include a set of tag data based on a configuration profile of the server. For example, the configuration profile of the server may indicate that only information to be stored in the master product state database 290 should be included in the uplink product update data set. The master database component 154 may update the master product state database 290 based on the uplink product update data set. An update to the master product state database 290 may include an addition of a data element, a modification of a data element, or a deletion of a data element. In an aspect, the update may be performed by merging a database storing the update data set with the master product state database. In an aspect, a conflict may occur when the master database component 154 receives an uplink product update data set from different RFID readers. The received time of the update may not be determinative because uplink product update data sets may be transmitted asynchronously, for example, when a wireless connection is available. Accordingly, the conflicts component 270 may resolve conflicts between a received uplink product update data set and the master product state database 290 based on one or more data elements. For example, the timestamp or signal strength may be used to determine which data set is more current or more accurate. For instance, a most recent time stamp may control unless a low signal strength indicates that the previous data may also be correct.

The profile component 280 may include a configuration profile for each RFID reader 140. The profile component 280 may determine that a local state database of a second wireless device should be updated based on the master product state database 290 and a configuration profile of the second wireless device. For example, based on the configuration profile of the second wireless device, the profile component 280 may determine that an update to the master product state database 290 by the first wireless device should be pushed to the second wireless device. The profile component 280 may determine a downlink product update data set including a subset of the uplink product update data set. The subset may include only data elements that have changed and only data elements indicated in the configuration profile of the second wireless device. For example, the downlink product update data set may include an item identifier and a location, but may not need to include a timestamp or signal strength because the RFID reader 140 does not resolve conflicts. Accordingly, the amount of data sent to the RFID reader 140 may be reduced. The communications component 260 may transmit the downlink product update data set to the second wireless device.

Figure 3:
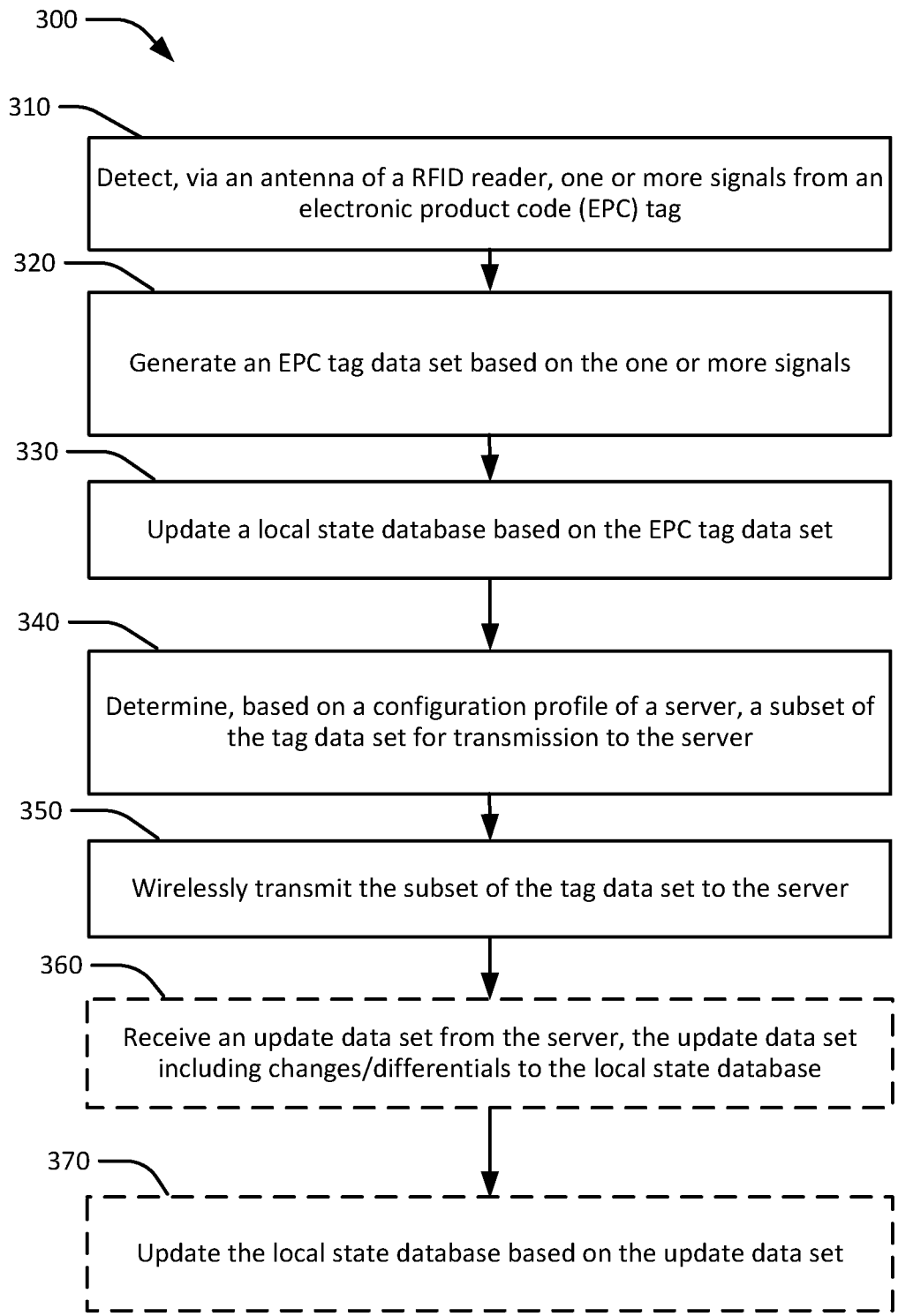
FIG. 3 is a flowchart of an example method for data synchronization for a wireless RFID reader within an inventory management system in accordance with aspects of the present disclosure.

FIG. 3 is flowchart of an example method 300 for inventory management utilizing radio-frequency identification (RFID) technology in accordance with aspects of the present disclosure. Aspects of method 300 may be performed by the RFID reader 140 as described with reference to FIG. 1 and FIG. 2 and/or by a computer device 500 in communication with the RFID reader as described with reference to FIG. 4.

At block 310, the method 300 may include detecting, via an antenna of a RFID reader, one or more signals from an EPC tag. In an aspect, for example, the synchronization component 142 may control the reader 210 to detect, via the antenna 212 of the RFID reader 140, one or more signals from the EPC tag 120.

At block 320, the method 300 may include generating an EPC tag data set based on the one or more signals. In an aspect, for example, the synchronization component 142 may control the reader 210 to generate an EPC tag data set based on the one or more signals.

At block 330, the method 300 may include updating a local state database based on the EPC tag data set. In an aspect, for example, the synchronization component 142 may update the local state database 220 based on the EPC tag data set.

At block 340, the method 300 may include determining, based on a configuration profile of a server, a subset of the tag data set for transmission to the server. In an aspect, for example, the synchronization component 142 may execute the profile component 230 to determine, based on a configuration profile of the server 152, a subset of the tag data set for transmission to the server 152.

At block 350, the method 300 may include wirelessly transmitting the subset of the tag data set to the server. In an aspect, for example, the synchronization component 142 may execute the communications component 240 to wirelessly transmit the subset of the tag data set to the server 152. In an aspect, block 350 may include compressing a database including the subset of the tag data set for transmission. For example, the communications component 240 may utilize LZ4 compression.

At block 360, the method 300 may optionally include receiving an update data set from the server, the update data set including changes/differentials to the local state database. In an aspect, for example, the synchronization component 142 may execute the communications component 240 to receive an update data set from the server, the update data set including changes/differentials to the local state database.

At block 370, the method 300 may optionally include updating the local state database based on the update data set. In an aspect, for example, the synchronization component 142 may update the local state database 220 based on the update data set. An update to the local state database 220 may include an addition of a data element, a modification of a data element, or a deletion of a data element. In an aspect, the update may be performed by merging a database storing the update data set with the local state database 220.

Figure 4:
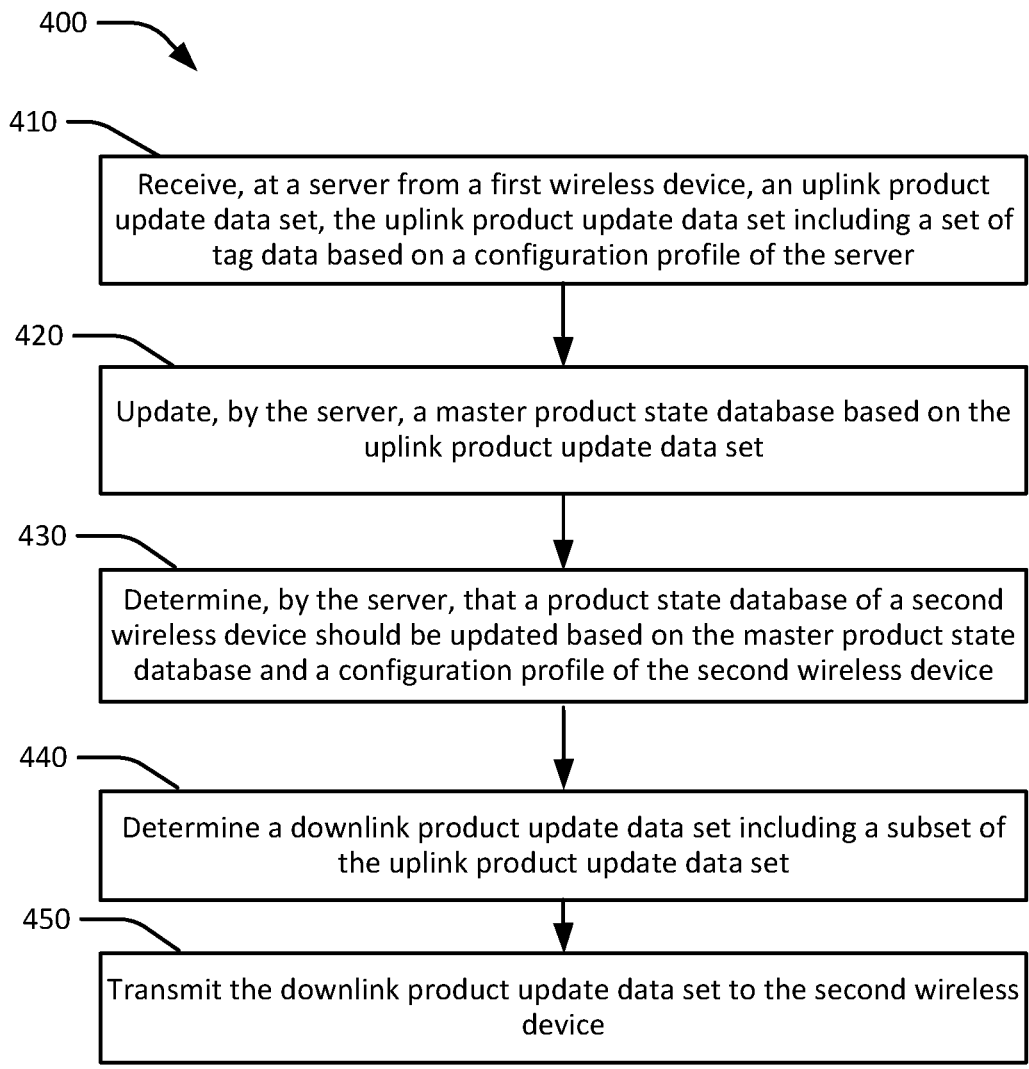
FIG. 4 is a flowchart of an example method for data synchronization for a server within an inventory management system in accordance with aspects of the present disclosure.

FIG. 4 is flowchart of an example method 400 for inventory management utilizing radio-frequency identification (RFID) technology in accordance with aspects of the present disclosure. Aspects of method 400 may be performed by the server 152 as described with reference to FIG. 1 and FIG. 2 and/or by a computer device 600 in communication with the RFID reader as described with reference to FIG. 6.

At block 410, the method 400 may include receiving, at a server from a first wireless device, an uplink product update data set, the uplink product update data set including a set of product data based on a configuration profile of the server. In an aspect, for example, the master database component 154 may execute the communications component 260 to receive, at the server 152 from a first wireless device (e.g. RFID reader 140), an uplink product update data set, the uplink product update data set including a set of product data based on a configuration profile of the server.

At block 420, the method 400 may include updating, by the server, a master product state database based on the uplink product update data set. In an aspect, for example, the master database component 154 may execute the conflicts component 270 to update, by the server, a master product state database 290 based on the uplink product update data set. In an aspect, updating the master product state database may include determining a conflict between the master product state database and the uplink product update data set. Updating the master product state database may include resolving the conflict by selecting a value for a data element based on a priority rule.

At block 430, the method 400 may include determining, by the server, that a product state database of a second wireless device should be updated based on the master product state database and a configuration profile of the second wireless device. In an aspect, for example, the master database component 154 may execute the profile component 280 to determine, by the server, that a product state database of a second wireless device (e.g., the RFID reader 144) should be updated based on the master product state database 290 and a configuration profile of the second wireless device.

At block 440, the method 400 may include determining a downlink product update data set including a subset of the uplink product update data set. In an aspect, for example, the master database component 154 may execute the profile component 280 to determine the downlink product update data set including the subset of the uplink product update data set.

At block 450, the method 400 may include transmitting the downlink product update data set to the second wireless device. In an aspect, for example, the master database component 154 may execute the communications component 260 to transmit the downlink product update data set to the second wireless device.

Figure 5:
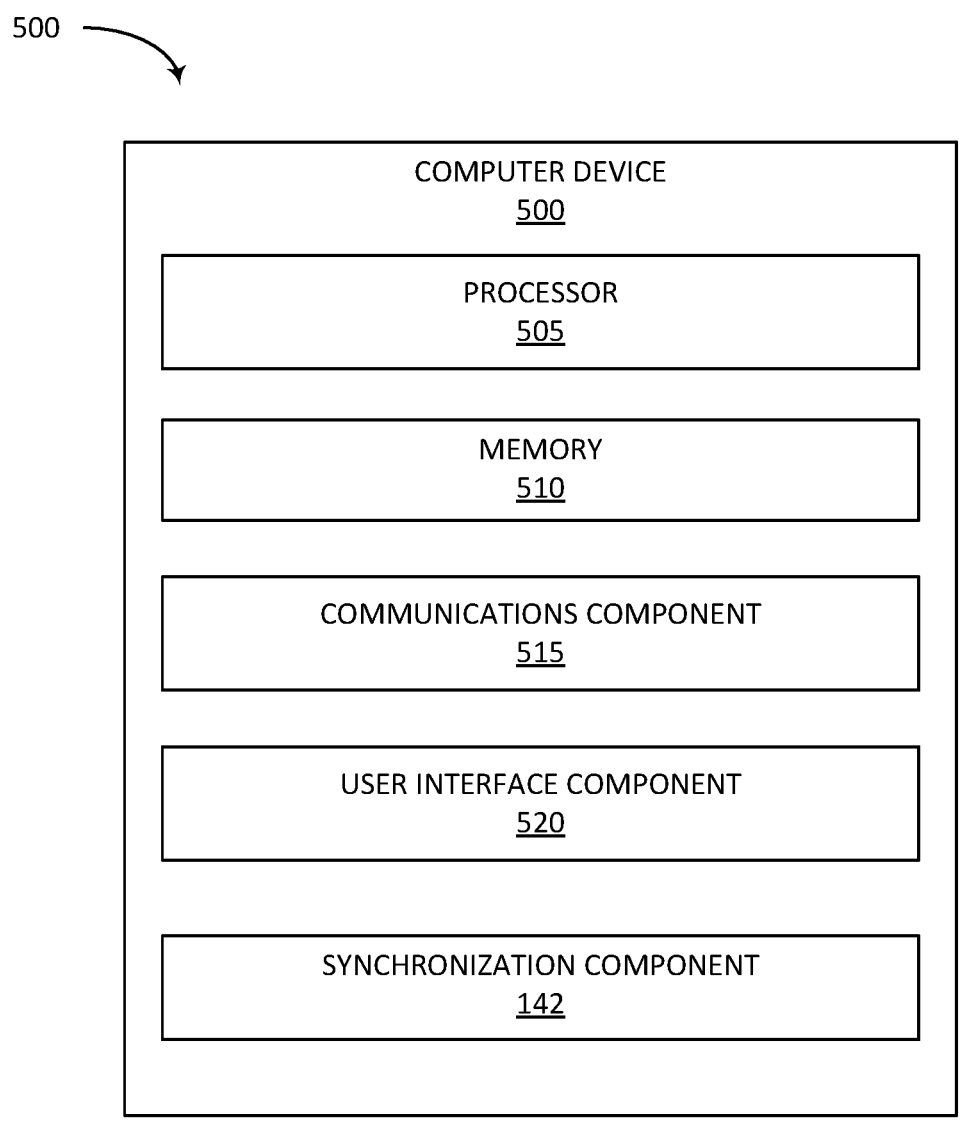
FIG. 5 is diagram illustrating an example of a hardware implementation for the wireless RFID reader in accordance with various aspects of the present disclosure.

Referring now to FIG. 5, a diagram illustrating an example of a hardware implementation for the computer device 500 in accordance with various aspects of the present disclosure is described. In some examples, the computer device 500 may be an example of the handheld RFID reader, or a backend computer device such as a standalone computer or a server in communication with one or more RFID readers that capture signals from one or more EPC tags with reference to FIG. 1.

The computer device 500 may include a processor 505 for carrying out one or more processing functions (e.g., method 300) described herein. The processor 505 may include a single or multiple set of processors or multi-core processors. Moreover, the processor 505 can be implemented as an integrated processing system and/or a distributed processing system.

The computer device 500 may further include a memory 510, such as for storing local versions of applications being executed by the processor 505. In some aspects, the memory 510 may be implemented as a single memory or partitioned memory. In some examples, the operations of the memory 510 may be managed by the processor 505. Memory 510 can include a type of memory usable by a computer, such as random access memory (RAM), read only memory (ROM), tapes, magnetic discs, optical discs, volatile memory, non-volatile memory, and any combination thereof. Additionally, the processor 505, and memory 510, may include and execute operating system (not shown).

Further, the computer device 500 may include a communications component 515 that provides for establishing and maintaining communications with one or more parties utilizing hardware, software, and services as described herein. Communications component 515 may carry communications between components and modules of the computer device 500. The communications component 515 may also facilitate communications with external devices to the computer device 500, such as to electronic devices coupled locally to the computer device 500 and/or located across a communications network and/or devices serially or locally connected to the computer device 500. For example, communications component 515 may include one or more buses operable for interfacing with external devices.

The computer device 500 may include a user interface component 520 operable to receive inputs from a user of the computer device 500 and further operable to generate outputs for presentation to the user. The user interface component 520 may include one or more input devices, including but not limited to a navigation key, a function key, a microphone, a voice recognition component, any other mechanism capable of receiving an input from a user, or any combination thereof. For example, the user interface component 520 may include a trigger to initiate a RFID scan for inventory management. Further, user interface component 520 may include one or more output devices, including but not limited to a display, a speaker, any other mechanism capable of presenting an output to a user, or any combination thereof.

The computer device 500 may further include a synchronization component 142 to perform one or more techniques discussed in this application, including reading an EPC tag, updating a server based on the tag, and receiving an update from the server.

Figure 6:
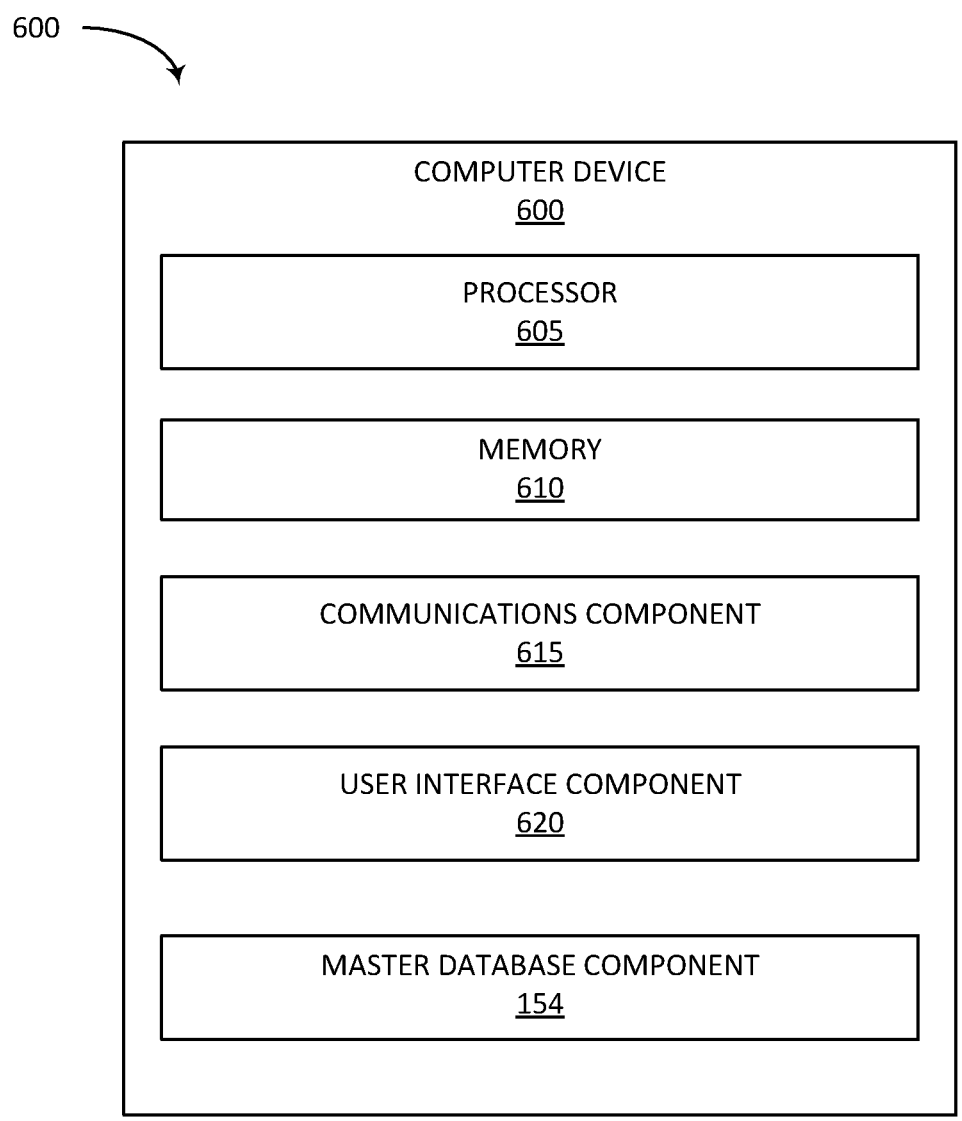
FIG. 6 is diagram illustrating an example of a hardware implementation for the server in accordance with various aspects of the present disclosure.

Referring now to FIG. 6, a diagram illustrating an example of a hardware implementation for the computer device 600 in accordance with various aspects of the present disclosure is described. In some examples, the computer device 600 may be an example of the handheld RFID reader, or a backend computer device such as a standalone computer or a server in communication with one or more RFID readers that capture signals from one or more EPC tags with reference to FIG. 1.

The computer device 600 may include a processor 605 for carrying out one or more processing functions (e.g., method 400) described herein. The processor 605 may include a single or multiple set of processors or multi-core processors. Moreover, the processor 605 can be implemented as an integrated processing system and/or a distributed processing system.

The computer device 600 may further include a memory 610, such as for storing local versions of applications being executed by the processor 605. In some aspects, the memory 610 may be implemented as a single memory or partitioned memory. In some examples, the operations of the memory 610 may be managed by the processor 605. Memory 610 can include a type of memory usable by a computer, such as random access memory (RAM), read only memory (ROM), tapes, magnetic discs, optical discs, volatile memory, non-volatile memory, and any combination thereof. Additionally, the processor 605, and memory 610, may include and execute operating system (not shown).

Further, the computer device 600 may include a communications component 615 that provides for establishing and maintaining communications with one or more parties utilizing hardware, software, and services as described herein. Communications component 615 may carry communications between components and modules of the computer device 600. The communications component 615 may also facilitate communications with external devices to the computer device 600, such as to electronic devices coupled locally to the computer device 600 and/or located across a communications network and/or devices serially or locally connected to the computer device 600. For example, communications component 615 may include one or more buses operable for interfacing with external devices.

The computer device 600 may include a user interface component 620 operable to receive inputs from a user of the computer device 600 and further operable to generate outputs for presentation to the user. The user interface component 620 may include one or more input devices, including but not limited to a navigation key, a function key, a microphone, a voice recognition component, any other mechanism capable of receiving an input from a user, or any combination thereof. Further, user interface component 620 may include one or more output devices, including but not limited to a display, a speaker, any other mechanism capable of presenting an output to a user, or any combination thereof.

The computer device 600 may further include a master database component 154 to perform one or more techniques discussed in this application, including receiving an uplink tag update set from a first wireless device, updating a master product state database, and transmitting a downlink tag update set to a second wireless device.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device, which can be a wired device or a wireless device. A wireless device may be a handheld RFID reader, a mobile device, cellular telephone, a satellite phone, a cordless telephone, a Session Initiation Protocol (SIP) phone, a wireless local loop (WLL) station, a personal digital assistant (PDA), a handheld device having wireless connection capability, a computer device, or other processing devices connected to a wireless modem.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for inventory management utilizing radio-frequency identification (RFID) technology, comprising:
   detecting, via an antenna of a RFID reader, one or more signals from an electronic product code (EPC) tag;
   generating an EPC tag data set based on the one or more signals;
   updating a local tag state database, on the RFID reader, based on the EPC tag data set, the local tag state database maintaining state information for EPC tags;
   determining, based on a configuration profile of a server, a subset of the state information in the local tag state database for wireless transmission to the server, wherein the configuration profile of the server includes an indication, for each data element of the state information for an EPC tag, Whether to include the data element in the subset and an indication of how often to send the subset, wherein the subset of the state information in the local tag state database includes only state changes of the data elements; and
   wirelessly transmitting the subset of the EPC tag data set to the server.

2. The method of claim 1, further comprising:
   receiving an update data set from the server, the update data set including changes to the local tag state database; and
   updating the local tag state database based on the update data set.

3. The method of claim 2, wherein the update data set includes changes for only data elements indicated in a device configuration profile and only for data elements that are different than the local tag state database.

4. The method of claim 1, wherein wirelessly transmitting the subset of the EPC tag data set to the server comprises compressing a database including the subset of the EPC tag data set.

5. The method of claim 1, wherein updating the local tag state database comprises merging a database storing the EPC tag data set with the local tag state database.

6. An apparatus for inventory management utilizing radio-frequency identification (RFID) technology, comprising:
   a memory configured to store instructions; and
   a processor communicatively coupled with the memory, the processor configured to execute the instructions to:
   detect, via an antenna of a RFID reader, one or more signals from an electronic product code (EPC) tag;
   generate an EPC tag data set based on the one or more signals;
   update a local tag state database, on the RFID reader, based on the EPC tag data set, the local tag state database maintaining state information for EPC tags;
   determine, based on a configuration profile of a server, a subset of the state information in the local tag state database for wireless transmission to the server, wherein the configuration profile of the server includes an indication, for each data element of the state information for an EPC tag, whether to include the data element in the subset and an indication of how often to send the subset, wherein the subset of the state information in the local tag state database includes only state changes of the data elements; and
   wirelessly transmit the subset of the EPC tag data set to the server.

7. The apparatus of claim 6, wherein processor is configured to:
   receive an update data set from the server, the update data set including changes to the local tag state database; and
   update the local tag state database based on the update data set.

8. The apparatus of claim 7, wherein the update data set includes changes for only data elements indicated in a device configuration profile and only for data elements that are different than the local tag state database.

9. The apparatus of claim 6, wherein the processor is configured to transmit the subset of the EPC tag data set to the server by compressing a database including the subset of the EPC tag data set.

10. The apparatus of claim 6, wherein the processor is configured to update the local tag state database by merging a database storing the EPC tag data set with the local tag state database.

11. A method for product management, comprising:
   receiving, at a server from a first wireless device, an uplink product update data set, the uplink product update data set including a set of update data based on a configuration profile of the server, wherein the configuration profile of the server includes an indication, for each data element of state information for an EPC tag, whether to include the data element from a local product state database of an RFID reader in the update data set and an indication of how often to send the update data set, wherein the uplink product update data set includes only state changes of the data elements;
   updating, by the server, a master product state database based on the uplink product update data set;
   determining, by the server, that a local product state database of a second wireless device should be updated based on the master product state database and a configuration profile of the second wireless device;
   determining a downlink product update data set including a subset of the uplink product update data set; and
   transmitting the downlink product update data set to the second wireless device.

12. The method of claim 11, wherein updating the master product state database comprises:
   determining a conflict between the master product state database and the uplink product update data set; and
   resolving the conflict by selecting a value for a data element based on a priority rule.

13. The method of claim 12, wherein the priority rule indicates that the value for the data element is the value associated with a most recent time stamp.

14. The method of claim 11, wherein the downlink product update data set includes changes for only data elements indicated in a device configuration profile and only for data elements that are different than the local product state database of the second wireless device.

15. The method of claim 13, wherein wirelessly transmitting the downlink product update data set comprises compressing a database including the downlink product update data set.

16. The method of claim 11, wherein updating the master product state database comprises merging a database storing the uplink product update data set with the master product state database.

17. The method of claim 11, wherein updating the master product state database based on the uplink product update data set includes an addition of a data element, a modification of a data element, or a deletion of a data element.

18. An apparatus for inventory management utilizing radio-frequency identification (RFID) technology, comprising:
a memory configured to store instructions; and
a processor communicatively coupled with the memory, the processor configured to execute the instructions to:
receive, at a server from a first wireless device, an uplink product update data set, the uplink product update data set including a set of update data based on a configuration profile of the server, wherein the configuration profile of the server includes an indication, for each data element of state information for an EPC tag, whether to include the data element from a local product state database of an RFID reader in the update data set and an indication of how often to send the update data set, wherein the uplink product update data set includes only state changes of the data elements;
update, by the server, a master product state database based on the uplink product update data set;
determine, by the server, that a local product state database of a second wireless device should be updated based on the master product state database and a configuration profile of the second wireless device;
determine a downlink product update data set including a subset of the uplink product update data set; and
transmit the downlink product update data set to the second wireless device.

19. The apparatus of claim 18, wherein the processor is configured to:
determine a conflict between the master product state database and the uplink product update data set; and
resolve the conflict by selecting a value for a data element based on a priority rule.

20. The apparatus of claim 19, wherein the priority rule indicate that the value for the data element s the value associated with a most recent time stamp.

21. The apparatus of claim 18, wherein the downlink product update data set includes changes for only data elements indicated in a device configuration profile and only for data elements that are different than the local product state database.

22. The apparatus of claim 18, wherein wirelessly transmitting the downlink product update data set comprises compressing a database including the downlink product update data set.

23. The apparatus of claim 18, wherein updating the master product state database comprises merging a database storing the uplink product update data set with the master product state database.

24. The apparatus of claim 18, wherein the processor is configured to update the master product state database based on the uplink product update data set by an addition of a data element, a modification of a data element, or a deletion of a data element.

* * * * *